Jan. 2, 1945.　　　W. R. FREEMAN　　　2,366,608
BRAKING SYSTEM
Filed Oct. 1, 1943
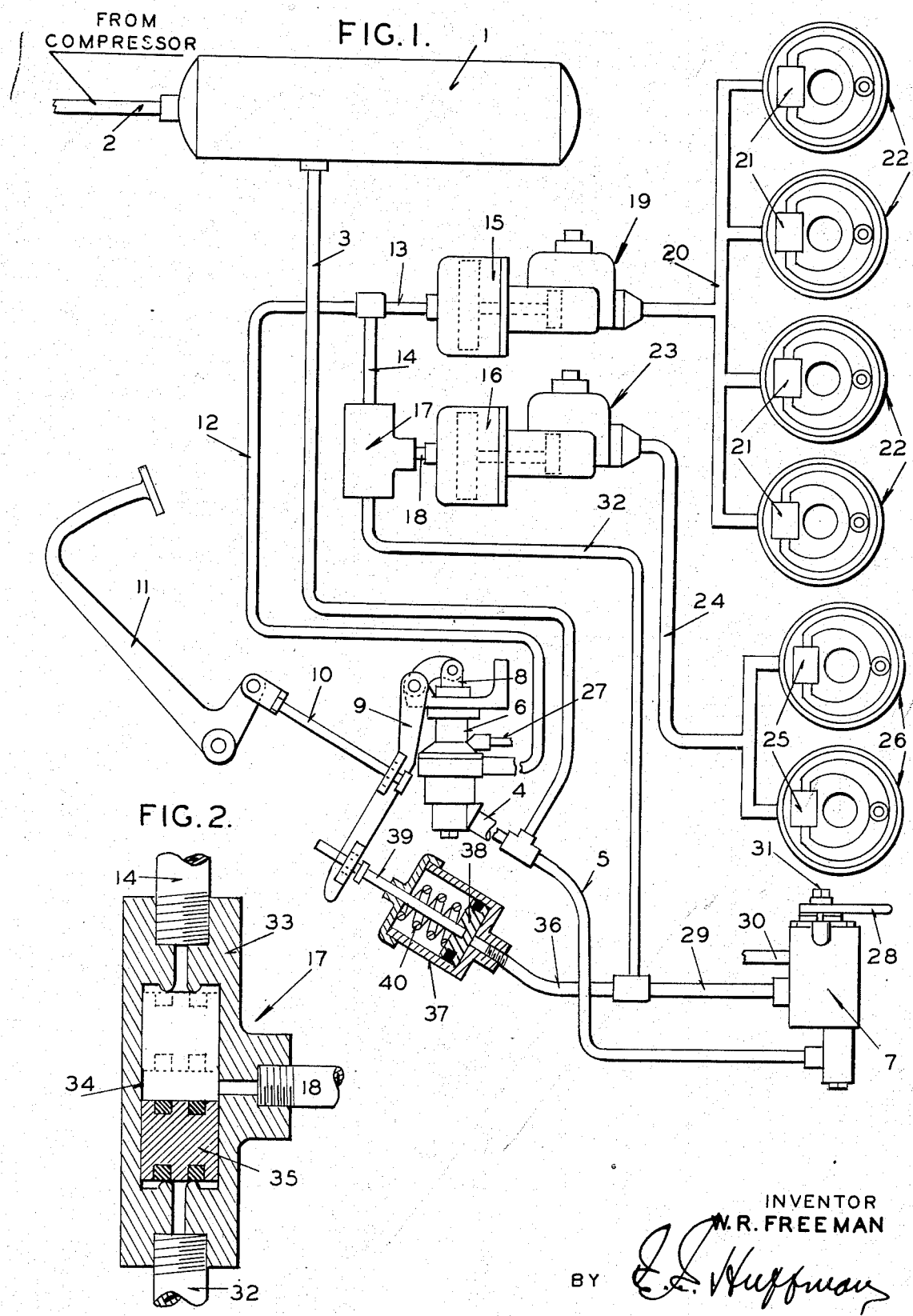
INVENTOR
W. R. FREEMAN
BY E. L. Huffman
ATTORNEY Patented Jan. 2, 1945

2,366,608

UNITED STATES PATENT OFFICE 2,366,608

BRAKING SYSTEM

Walter R. Freeman, Clayton, Mo., assignor to Wagner Electric Corporation, St. Louis, Mo., a corporation of Delaware Application October 1, 1943, Serial No. 504,538

14 Claims. (Cl. 188—152)

My invention relates to a fluid pressure system and more particularly to one for use in controlling vehicle brakes.

One of the objects of my invention is to provide an improved fluid pressure system which will permit a vehicle operator to apply certain brakes with a greater fluid pressure than other brakes.

Another object of my invention is to provide, in a fluid pressure actuated system which is controlled by two valves, means which will cause all fluid actuated motors to be operated with equal fluid pressures when one valve is operated and will cause certain fluid motors to be actuated with greater fluid pressure than other fluid motors when the other valve is operated.

Yet another object of my invention is to so associate two application valves in a fluid pressure system that one valve, when operated, will cause such operation of the other valve by fluid pressure admitted through the first valve that the fluid pressure admitted through the second valve will have a proportionally lower value than the fluid pressure admitted through the first valve.

A more specific object of my invention is to produce an improved tractor-trailer vehicle braking system employing both foot-operated and hand-operated control or application valves which will permit the trailer brakes to be applied with greater fluid pressure than the tractor brakes when the hand valve is operated and without the use of a differential fluid pressure control valve mechanism.

Other objects of my invention will become apparent from the following description taken in connection with the accompanying drawing in which Figure 1 is a schematic view of the braking system embodying my invention and employed for controlling the brakes on a tractor-trailer vehicle; and Figure 2 is a sectional view showing details of the two-way valve mechanism.

Referring to the drawing in detail, numeral 1 indicates a storage tank for air under pressure, said air being received through a conduit 2 from a suitable source of pressure fluid such as a compressor. Leading from the storage tank is a conduit 3 which connects with branch conduits 4 and 5, the former communicating with the inlet port of a foot-operated application or control valve 6 and the latter with a hand application or control valve 7. The foot application valve 6 is of known construction and is preferably of the metering type being operated by a stem 8 and a lever 9, said lever being connected by a link 10 with a foot pedal 11. The outlet of the foot-operated application valve is connected to a conduit 12 communicating with branch conduits 13 and 14, the former being connected to a power cylinder 15 and the latter to a power cylinder 16 by way of a two-way valve mechanism 17 and a conduit 18. The power cylinder 15 operates a master cylinder device 19 which is connected by conduit means 20 with fluid motors 21 of brake assemblies 22 which can be employed on tractor wheels of a tractor-trailer vehicle. The power cylinder 16 operates a master cylinder device 23 which is connected by a conduit means 24 with the fluid motors 25 of brake assemblies 26, these brake assemblies being associated with the trailer wheels of the tractor-trailer vehicle.

The foot-operated application valve is also provided with an exhaust port which communicates with a conduit 27 opening to atmosphere. When this application valve is inoperative, the exhaust port is connected to conduit 12 so that all air under pressure in said conduit and the power cylinders 15 and 16 will be released and the inlet valve element will be closed so that no air under pressure from the storage tank can be admitted to conduit 12. When the foot pedal is operated, the exhaust port will be closed and the inlet valve element opened so that fluid under pressure can flow from the storage tank to the power cylinders and thus operate the master cylinders and the brakes connected thereto in a well-known manner. The extent of depression of the foot pedal will determine the amount of air pressure which is admitted to the power cylinders since the application valve, as previously stated, is preferably of the metering type.

The hand-operated application valve 7 is of well-known construction and is operated by a handle 28. In this hand-operated application valve there is an inlet valve element for controlling the connection between conduit 5 and a conduit 29 which is connected to the outlet port of the hand valve, said inlet valve element being normally closed when the application valve is inoperative. The hand valve is also provided with an exhaust valve element which places conduit 29 in communication with the exhaust conduit 30 leading to atmosphere when the valve is inoperative. When handle 28 rotates the control shaft 31 of the hand valve, the exhaust valve element will be closed and the inlet valve element opened, thus connecting the storage tank to conduit 29, which conduit communicates with a second conduit 32 leading to the two-way valve mechanism 17 previously referred to. The hand-operated application valve is also preferably of the metering type and the amount of air pressure admitted to conduit 29 will depend upon the extent of rotation of the handle.

The two-way valve mechanism 17 is shown in section in Figure 2 and comprises a casing 33 having a cylinder 34, one end of which is connected to conduit 14 and the other end to conduit 32. The central part of the cylinder communicates with conduit 18 which leads to power cylinder 16. Within cylinder 34 is a piston valve element 35 which can reciprocate back and forth to selectively connect conduits 14 and 32 with conduit 18. When there is no fluid under pressure in conduit 32 or when the fluid pressure in said conduit is below the fluid pressure in conduit 14, the piston valve element will automatically assume the position shown in full lines in Figure 2. Under these conditions conduit 14 will be directly connected to conduit 18 and the power cylinder 16. If there should be no fluid under pressure in conduit 14 or the fluid pressure should be less than the fluid pressure in conduit 32, the piston valve element will be automatically forced to the dotted line position by the differential pressure, thus cutting off communication between conduits 14 and 18 and placing conduit 32 in direct communication with conduit 18.

When it is desired to have all the brakes on both the tractor and trailer applied with equal pressure, the foot pedal operated application valve 6 is controlled. With the hand-operated application valve inoperative there will be no pressure in conduit 32 and, therefore, whenever the application valve 6 is operated by the foot pedal, it will be apparent that the two-way valve mechanism functions so both power cylinders 15 and 16 are connected to the storage tank through the application valve. The force applied to the master cylinders by the power cylinders 15 and 16 will be the same.

In prior known tractor-trailer braking systems the hand valve is generally employed to control only the trailer brakes as would be the operation of the system so far described since, when the hand-operated valve 7 is operated independently of valve 6, the two-way valve mechanism 17 will function so that only power cylinder 16 will be operated to control the trailer brakes. With such a system the operator generally uses this hand valve more frequently than contemplated by the designers of the braking system and consequently the trailer brakes are caused to perform excessive braking. To prevent this I have arranged the system so that the tractor brakes will be applied whenever the trailer brakes are applied by the operation of the hand application valve but the braking pressure applied to the tractor brakes is caused to be less than that applied to the trailer brakes. Thus it is seen that the desired result of having the greatest braking drag on the rear vehicle (for better control of the vehicle on icy pavements, etc.) is retained but the trailer brakes are prevented from doing all the braking. I accomplish hand control of different braking action on the tractor and trailer by providing means for automatically operating the foot-operated application valve 6 whenever the hand-operated application valve is controlled. The arrangement is such that the foot-operated application valve 6 will admit fluid pressure to operate power cylinder 15 for the tractor brakes with less pressure than that which was admitted by the hand valve to conduit 32 and power cylinder 16 employed to operate the trailer brakes. Leading from conduit 29 connected to the outlet of the hand application valve 7 is a conduit 36 which is connected to a cylinder 37 having a piston 38. This piston is connected by a piston rod 39 to lever 9 of the foot-operated application valve 6. A spring 40 is associated with the piston and must be compressed whenever the piston is operated by air pressure from conduit 36. The connection between piston rod 39 and lever 9 is such that lever 9 can be operated freely without moving the piston rod and piston 38 whenever lever 9 is actuated by the foot pedal. Also, the connection between link 10 moved with the foot pedal and lever 9 is such as to permit operation of lever 9 by piston 38 without simultaneously moving the foot pedal.

With the above described arrangement for operating the foot application valve, it is to be noted that whenever the hand valve is operated to admit fluid pressure to power cylinder 16, piston 38 will also be operated and cause operation of application valve 6 to admit fluid pressure to power cylinder 15 which controls the operation of the tractor brakes. The size of piston 38 and the leverage of lever 9 is so arranged that the amount of air under pressure admitted to operate the power cylinder 15 will be less than that admitted to power cylinder 16 when the hand valve is operated. Because of this, the piston valve element 35 of the two-way valve will not be moved from the dotted line position shown in Figure 2 where it is held by the greater pressure admitted through valve 7. With the piston valve element in this position, there will be direct communication between conduit 32 and power cylinder 16 and there will be no communication between conduit 14 and power cylinder 16. By merely changing the strength of spring 40 associated with piston 38, it will be possible to vary the difference between the air pressures which are effective in power cylinders 15 and 16 whenever the hand valve is operated. The spring can be strong enough so as to cause the trailer brakes to be applied ahead of the tractor brakes. By varying the size of piston 38 or the leverage ratio of lever 9, the difference can also be varied.

From the foregoing it is seen that I have provided an improved braking system for a tractor-trailer vehicle which will permit the brakes on both vehicles to be applied with equal pressure whenever the foot pedal for controlling the foot-operated application valve is actuated. When it is desired to have a greater braking application on the trailer than on the tractor, the hand valve will be operated.

Although the system has been described as being employed for operating tractor-trailer brakes, it is obvious that the system could also be employed for brakes on a single four wheel vehicle where it is desired to have the same braking action on the front and rear wheels under normal braking operation where the foot pedal is operated and a different braking action on the front and rear wheels under other conditions, which braking action will be controlled by the independently operated hand-controlled application valve. It is also apparent that power cylinders can be used to directly apply the brake assemblies instead of applying them through a hydraulic pressure system.

Being aware of the possibility of modifications in the particular structure herein described without departing from the fundamental principles of my invention, I do not intend that its scope be limited except as set forth by the appended claims.

Having fully described my invention, what I claim as new and desire to secure by Letters Patent of the United States is:

1. In a fluid pressure system, a source of fluid pressure, two fluid pressure actuated devices, conduit means between the source and the devices, a control valve associated with the conduit means for controlling the flow of fluid under pressure to both devices, and means comprising a second control valve for causing fluid pressure from the source to be effective in one device independently of the first valve and said first valve to be operated by said fluid pressure to cause a low fluid pressure to be effective in the other device.

2. In a fluid pressure system, a source of fluid pressure, two fluid pressure actuated devices, conduit means between the source and the devices, a control valve associated with the conduit means for controlling the flow of fluid under pressure to the devices, means for connecting the source to one of the devices only and comprising a second control valve, and means for operating the first control valve to cause a lower fluid pressure to be transmitted from the source to the other fluid motor when the second valve is operated.

3. In a fluid pressure system, two fluid pressure actuated devices, means comprising control means for simultaneously causing both devices to be actuated by equal fluid pressures, an operator-operated member for controlling the operation of the control means, means comprising a second control means for causing fluid pressure to actuate one of the devices, and means for so operating the first control means by the fluid pressure employed to actuate said one device as to cause the other device to be actuated by a lower fluid pressure.

4. In a fluid pressure system, a source of fluid pressure, two fluid pressure actuated devices, conduit means between the source and the devices, a control valve associated with the conduit means for controlling the flow of fluid under pressure to both devices, means comprising a second control valve for causing fluid pressure from the source to be effective in one device independently of the first valve, a fluid motor for operating the first control valve, and means for operating the fluid motor by fluid pressure admitted through the second control valve.

5. In a fluid pressure system, a source of fluid pressure, two fluid pressure actuated devices, conduit means between the source and the devices, a control valve associated with the conduit means for controlling the flow of fluid to both devices, means comprising other conduit means for connecting the source to one device, a second control valve for said other conduit means, automatically operable shut-off valve means for preventing the second conduit means from communicating with the other device when the second control valve is operated, and means operable by fluid pressure controlled by the second valve for causing operation of the first control valve to permit fluid pressure to be effective in said other device.

6. In a fluid pressure system, a source of fluid pressure, two fluid pressure actuated devices, conduit means between the source and the devices, a control valve associated with the conduit means for controlling the flow of fluid to both devices, means comprising other conduit means for connecting the source to one device, a second control valve for said other conduit means, automatically operable shut-off valve means for preventing the second conduit means from communicating with the other device when the second cotnrol valve is operated, and a fluid motor connected to operate the first control valve and being actuated by fluid pressure controlled by the second control valve.

7. In a fluid pressure system, a source of fluid pressure, two fluid pressure actuated devices, conduit means between the source and the devices, a control valve for the conduit means, other conduit means between the source and one of the devices, a second control valve for said other conduit means, a two-way valve mechanism for automatically disconnecting the last named device from the first named conduit means when the fluid pressure admitted through the second control valve is greater than the fluid pressure admitted through the first control valve, and means for operating the first control valve by fluid pressure admitted through the second control valve so that the fluid pressure admitted through the first control valve will be lower than that through the second valve.

8. In a fluid pressure system, a source of fluid pressure, two fluid pressure actuated devices, conduit means between the source and the devices, a foot-operated control valve for the conduit means, other conduit means between the source and one of the devices, a hand-operated control valve for said other conduit means, a two-way valve mechanism for automatically disconnecting the last named device from the first named conduit means when the fluid pressure admitted through the hand-operated control valve is greater than the fluid pressure admitted through the foot-operated control valve, and means comprising a fluid motor for operating the foot-operated control valve by fluid pressure admitted through the hand-operated control valve and independently of foot effort.

9. In a fluid pressure brake actuating system for controlling two sets of brakes, valve means for actuating both sets of brakes by equal fluid pressures, a second means for actuating one set of brakes by fluid pressure, and means under the influence of said second means for controlling said first named valve means to admit a lower fluid pressure to one set of brakes while a higher pressure fluid is admitted to the other set of brakes.

10. In a fluid pressure brake actuating system for controlling two sets of brakes, means comprising operator-operated means for actuating both sets of brakes by equal fluid pressures, means comprising other operator-operated means for actuating one set of brakes by fluid pressure, and means controlled by said other means controlling said first named means to admit a lower fluid pressure to the other set of brakes.

11. In a fluid pressure brake actuating system for controlling two sets of brakes, a source of air pressure, means comprising a control valve for actuating both sets of brakes simultaneously by equal air pressure from the source, means comprising a second control valve and shut-off valve means for actuating one set of brakes by air pressure from the source, said shut-off valve means being automatically operable by air pressure controlled by the second control valve and functioning to prevent actuation of the other set of brakes by said air pressure employed to actuate said one set of brakes, and means operable by the fluid pressure controlled by the second control valve for causing such operation of the first control valve as to actuate the first set of brakes by a lower air pressure than that which actuates said other set of brakes.

12. In a fluid pressure brake actuating system for controlling two sets of brakes, a source of air pressure, means comprising a control valve for actuating both sets of brakes simultaneously by equal air pressure from the source, means comprising a second control valve and shut-off valve means for actuating one set of brakes by air pressure from the source, said shut-off valve means being automatically operable by air pressure controlled by the second control valve and functioning to prevent actuation of the other set of brakes by said air pressure employed to actuate said one set of brakes, and means comprising a fluid motor operable by the fluid pressure controlled by the second control valve and connected to operate the first valve so as to actuate the first set of brakes by a lower air pressure than that which actuates said other set of brakes.

13. In a fluid pressure brake actuating system for controlling two sets of brakes, a source of air pressure, means comprising a control valve for actuating both sets of brakes simultaneously by equal air pressure from the source, a foot pedal for actuating the control valve, means comprising a hand-operated second control valve and shut-off valve means for actuating one set of brakes by air pressure from the source, said shut-off valve means being automatically operable by air pressure controlled by the second control valve and functioning to prevent actuation of the other set of brakes by said air pressure employed to actuate said one set of brakes, and means comprising a fluid motor operable by the fluid pressure controlled by the second control valve and connected to operate the first valve independently of manual effort on the foot pedal so as to actuate the first set of brakes by a lower air pressure than that which actuates said other set of brakes.

14. In a fluid pressure system, a first and a second pressure fluid actuated device, a manually-controlled valve, means to apply equal pressure fluid to each device which includes a control means for each device and a second valve mechanism by fluid pressure passed by said manually-controlled valve, an operator-operated member for controlling the operation of the control means and to shift said second valve mechanism to operate said first device at full pressure, and other means operable by fluid pressure under the control of said operator-operated member to control said manually-controlled valve to apply a reduced pressure to said second device while a higher pressure is applied to said first device.

WALTER R. FREEMAN.